Dec. 1, 1953 A. J. HENNIKE ET AL 2,660,758
INJECTION FLASK APPARATUS
Filed June 14, 1952 2 Sheets-Sheet 1

INVENTORS.
ANTHONY J. HENNIKE,
GORDON MORRIS
AND ELZA E. BROADY.
BY Willard S. Grow
ATTORNEY.

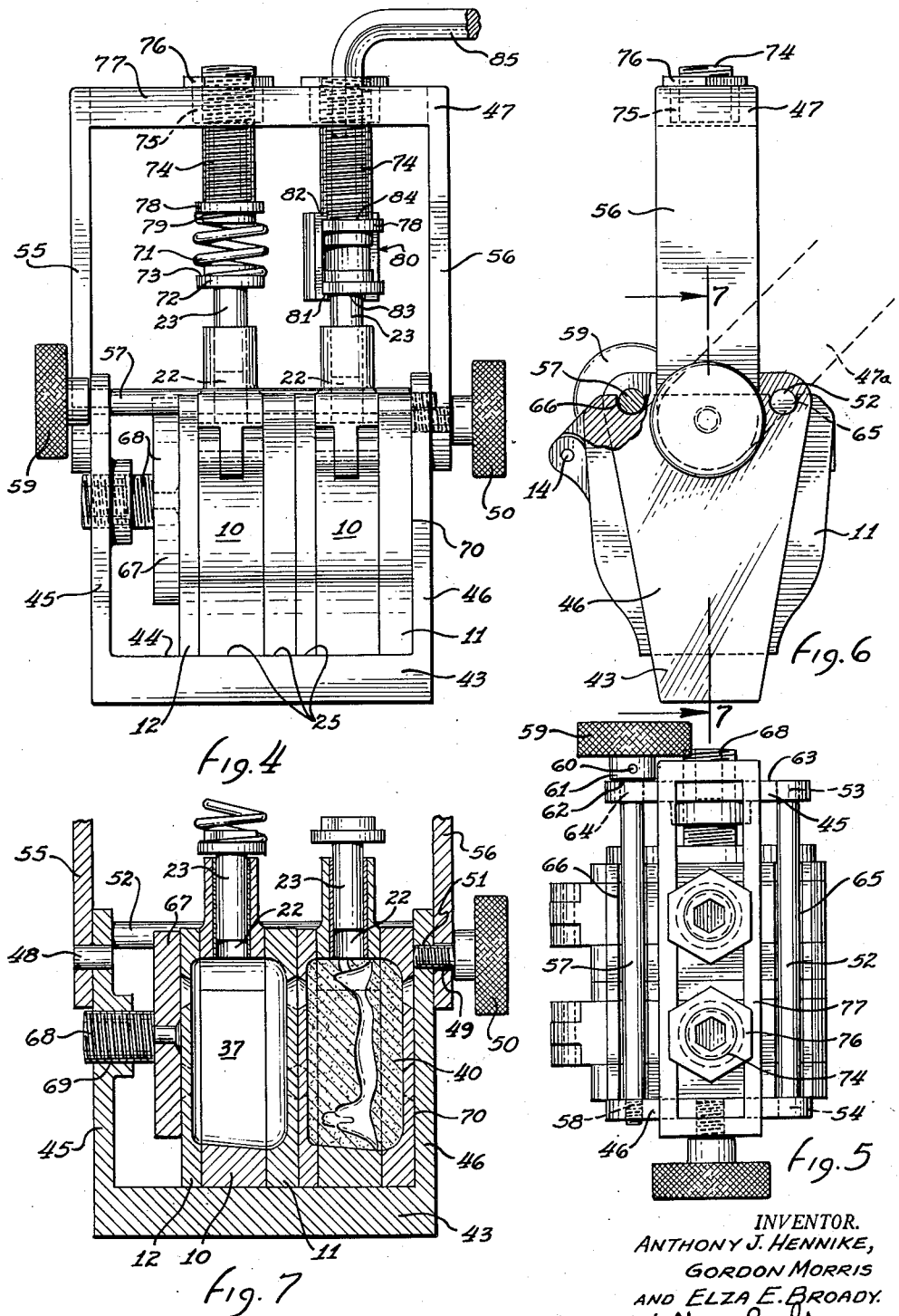

Patented Dec. 1, 1953

2,660,758

UNITED STATES PATENT OFFICE 2,660,758

INJECTION FLASK APPARATUS

Anthony J. Hennike, Gordon Morris, and Elza E. Broady, Phoenix, Ariz.

Application June 14, 1952, Serial No. 293,602

2 Claims. (Cl. 18—33)

1

This invention pertains to improvements in injection flask apparatus, and is more particularly directed to improvements in injection flasks for making false teeth plates and the like.

One of the objects of this invention is to provide an improved flask structure containing the mould form which is rigid in construction, is especially adapted to receive the injection pressures, and which may be readily disassembled for quick removal of the mould material at the conclusion of the injection operation.

Still another object of this invention is to provide an improved injection flask having an injection plunger located in the side of a central member and in which there are provided side plate members and a hinge and latch arrangement to facilitate disassembly of the mould materials at the completion of the injection operation while at the same time providing a strong and rigid flask structure.

Still another object of this invention is to provide an improved injection flask apparatus which is especially adapted to the injection and heat treatment of the injected material in the mould while at the same time providing a rapid and efficient apparatus for inserting and removing the flasks with a minimum of time, effort and skill upon the part of the operator being required.

Still another object of this invention is to provide an improved injection flask apparatus including resilient means for maintaining pressure in the flask during the heat treating operation and in effecting efficient and positive release of the injection plunger at the conclusion of the heat treating operation and at the same time providing quick and easy facility for knocking down the flask and removing the casting and mould therefrom.

Further features and advantages of this invention will appear from a detailed description of the drawings in which:

Fig. 4 is a side elevation of the clamping and pressure plunger actuating apparatus for the injection flask shown in Figs. 1, 2 and 3.

Fig. 5 is a plan view of the apparatus shown in Fig. 4.

Fig. 6 is a side elevation of the apparatus shown in Figs. 4 and 5.

2

Fig. 7 is a fragmentary sectional view on the line 7—7 of Fig. 6.

Figure 1:
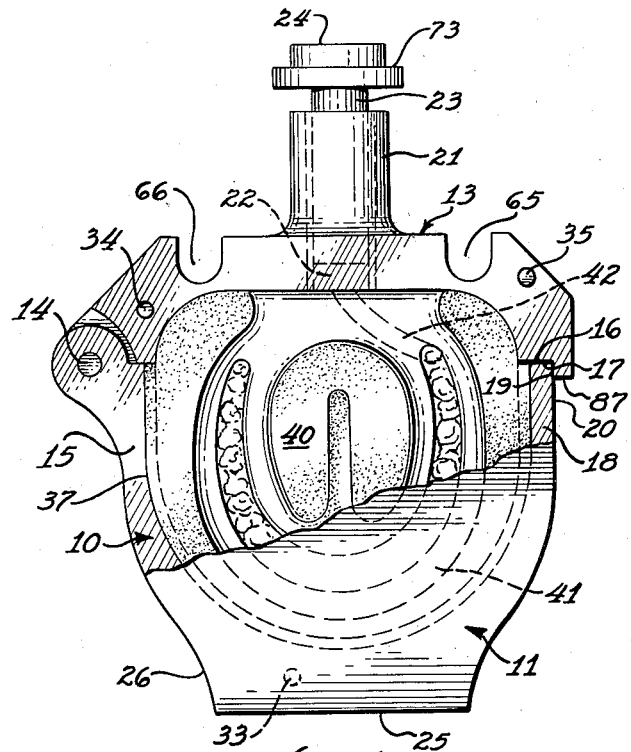
Fig. 1 is a side elevation, partly broken away on the line 1—1 of Fig. 2, showing an injection flask incorporating the features of this invention.
Figure 2:
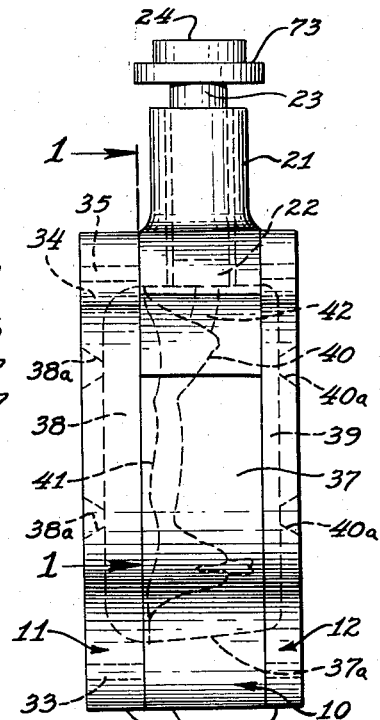
Fig. 2 is a side elevation of the injection flask shown in Fig. 1.
Figure 3:
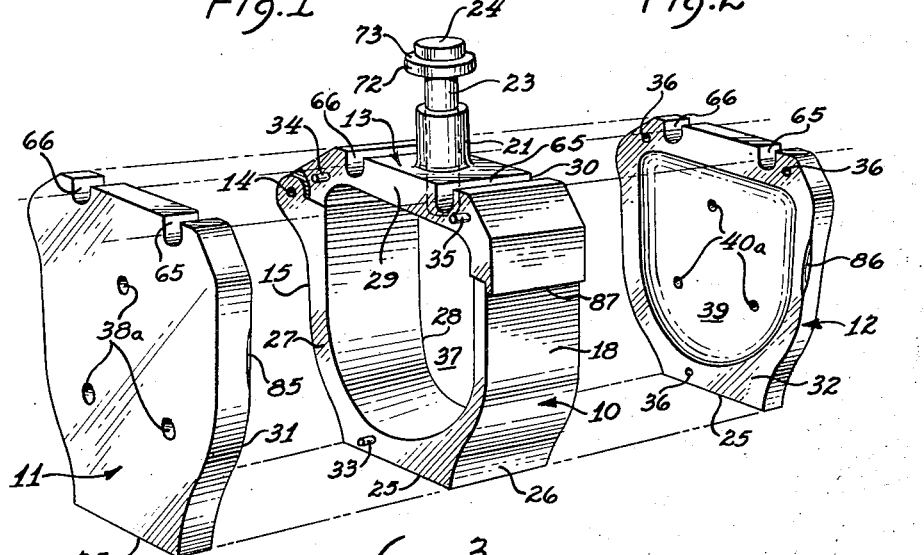
Fig. 3 is an exploded view of the subject matter shown in Figs. 1 and 2.

As exemplary of one embodiment of this invention there is shown an injection flask, Figs. 1, 2 and 3, comprising the main central member 10 and the two side plate members 11 and 12. The central member 10 has the hinge top cap piece 13 carried on a suitable hinge pin 14 on one of the upwardly extending arms 15 of the member 10. The other end of the top cap piece 13 is provided with an abutment surface 16 which engages a mating abutment surface 17 on the top of the other upwardly extending arm 18 of the central member 10. There is also provided a latching surface 19 engaging down over the surface 20 of the upwardly extending arm 18 so as to secure the arm 18 against any outward springing movement when pressure is applied in the flask.

In an upstanding boss 21 formed integral with the top cap piece 13 there is formed a cylinder bore 22 in which nicely slides the injection plunger 23 having the top pressure abutment surface 24. Posing downward pressure on the surface 24 of the injection plunger 23 is the base or abutment surface 25 which is formed on the bottom portion 26 of the member 10 to which the upwardly extending arms 15 and 18 are integrally formed.

The side surfaces 27 and 28 of the central member 10 and the surfaces 29 and 30 of its cap piece 13 are accurately machined parallel and are adapted to matingly engage the respective faces 31 of the side plate members 11 and 12 of the side plate 12, as best seen in Fig. 3. Suitable locating and securing pins 33, 34 and 35 carried in the members 10 and 13 engage in mating holes 36 formed in each of the side plates 11 and 12. The pins and holes referred to serve to properly accurately position the side plates 11 and 12 on the members 10—13 and also serve to secure initially the top cap piece 13 in proper latched position on the member 10.

There is thus formed a cavity 37 in the central member 10 and its cap piece 13 and mating cavities 38 and 39 respectively in the side plates 11 and 12 in which is carried the prepared mould comprising the material positioned at 40 and supported in the member 10—13 and side plate 12 and the mould portion 41 secured in the cavity 38 and to the side plate 11. Suitable chamfered holes 40a and the tapered surface 37a in the respective members 12 and 10 serve to hold the mould material 40 rigidly into these portions of the injection flask while similar chamfered openings 38a secure the mould 41 in the side plate member 11. A suitable gate or passageway 42 is formed in the mould material 40 and connects with the inner end of the injection cylinder 22. The preparation of the mould material 40 and 41 in the flask as described is done in a well known conventional manner forming no specific part of this invention. Having thus prepared the preliminary mould 40—41 in the flask as described, the plastic to be injected therebetween is placed in the cylinder 22 and the injection plunger 23 then inserted and forced downwardly to drive the material into the mould 40—41 and thus make the false teeth plate or the like. The problem here involved however is several fold in that the mould must be securely held together with all of its respective parts 10, 11, 12 and 13 rigidly held against any movement when high pressure is applied to the injection plunger 23. It is also a problem to heat the flask in boiling water, steam or other heating means to properly heat treat the plastic when injected in the mould to produce the desired finished product. Thirdly, it is a problem to release the plunger from its spring loaded condition during said heat treating operation, at the conclusion of said heat treatment with speed and facility and at the same time being able to promptly and quickly disassemble the mould and remove the finished product with a minimum of effort and time being required.

To this end there has been provided in connection with the flask of the design shown in Figs. 1 thru 3, a compression and securing apparatus for preparing and holding the flask during the heat treating operation and for final withdrawal of the injection plunger and disassemble of the flasks at the conclusion of the heat treating operation, this arrangement being shown particularly in Figs. 4, 5, 6 and 7 wherein there is provided a U-shaped base member comprising the main base plate member 43 having an abutment surface 44 upon which rests the base surfaces 25 on the bottom of the flask. Upstanding integral standards 45 and 46 are formed on the base member 43 to which is pivotally mounted the swinging U-shaped yoke member 47 which is connected thru a pivot pin 48 the upper end of the standard 45 and which is connected thru a clampable pivotal connection 49 having a clamping knob 50 and a threaded connection 51 in the standard 46 so that the knob 50 may be tightened to lock the yoke member 47 in any tilted position on the standards 45 and 46, as can best be seen in Fig. 6.

Tie rod means comprising the tie bar 52, as best seen in Fig. 5, is fixed at 53 and 54 to the upper rear portions of the standards 45 and 46 so as to prevent any deflection or spreading of the upper ends of the standards 45 and 46 or the downwardly projecting side members 55 and 56 of the yoke member 47. In addition to the fixed tie bar 52 there is provided a demountable tie bar for the same purpose as the bar 52 comprising the bar member 57 threadedly engageable with the standard 46 in the threaded bore 58 therein and having the rotating knob 59 rigidly fixed to the rod 57 by a pin 60 passing thru the hub of the knob 59 and which hub 61 has an abutment surface 62 engaging the outer face 63 of the standard 45 so that when the demountable tie bar 57 is inserted thru the bore 64 in the standard 45 and the threaded end 58 engaged with the standard 46 and the knob 59 rotated the entire structure will be locked up securely by the tie bars 52 and 57 against any spreading of these members at the point of pivotal connection 48—49 of the yoke member 47 with the base member 43.

With the knob 50 loosened and the yoke member 47 swung back to the position 47a and the demountable tie rod 57 removed, one or more of the injection flasks, such as shown in Figs. 1, 2 and 3, may be inserted in the pressure injecting and clamping up unit just described, in Figs. 4, 5, 6 and 7. The flasks, including their central member 10 and the side plates 11 and 12, are provided with cut away slots 65 and 66, the slot 65 hooking around the fixed tie bar 52 as best seen in Figs. 5 and 6, so as to enable the flasks to be placed down with their bottom face 25 in firm abutment with the face 44 of the member 43. The demountable tie rod 57 is then inserted as described and passes thru the cut away slot 66 in the flasks. Thus the flasks are held against tipping out of firm resting position on the surface 44 of the base plate 43. A side clamping pressure element comprising a disc 67 carried on a clamping screw 68 threadably mounted at 69 in the standard 45 is then moved by tightening the screw 68 up against the side of one or more of the flasks to force them firmly up against the abutment surface 70 on the inside of the standard 46 so as to secure the flasks in sidewise position and also to secure all of the side plates 11 and 12 securely to the central members 10—13 of the flasks.

The injection plungers 23 are then removed, the plastic injection material inserted in their respective cylinders 22 and the pressure plungers reinserted in the cylinders 22, as best seen in Fig. 4. A compression spring 71 is then placed on top of the shoulder 72 against the abutment surface 73 thereof and the yoke member 47 rocked upwardly from its position 47a to position 47 as shown in Fig. 6, to bring the clamping screw 74 threadedly carried at 75 in the clamping screw bushings 76 secured to the cross member 77 of the yoke 47 into alignment with the plunger 23. The screw 74 then is tightened down so that its shoulder 78 has its under side abutment surface 79 engaged with the compression spring 71, the screw being tightened until all of the plastic material in the cylinder 22 is fully injected into the mould 40—41 and the screw further tightened to substantially completely compress the spring 71. This may be done for each or any number of flasks presented in the apparatus as described.

The entire unit thus clamped up on the flask with the material injected in the mould is then subjected to heat treatment such as a water or stream bath or any other suitable means to maintain the temperature of the flask at the desired amount and for the desired period of time.

At the completion of the heat treating operation it is invariably found that the plastic in the cylinder 22 tends to lock the plunger 23 against easy withdrawal from the flask so that applicant provides a U-shaped pull-out piece 80 having inner abutment faces 81 and 82 adapted to engage the under face 83 of the member 72 of the plunger 23 and the upper surface 84 of the member 78 of the clamping screw 74. Thus upon backing up the screw by applying a suitable wrench 85, the plunger will be fully withdrawn with ease from its respective cylinder 22 in the flask. The operator then withdraws the demountable tie rod 57 as described, loosens the side pressure plates 68 and loosens the knob 50 so as to rock the yoke member 47 back to position 47a, whereupon the flasks may be readily removed from under the fixed tie bar 52 and out from the surface 44 of the clamping up mechanism as described.

The side plates of the flasks may now be readily withdrawn by driving a chisel or screw driver in the notched portions 85 and 86 of the side plate members 11 and 12 to quickly separate them from the center piece 10—13. Further, by striking the surface 87 adjacent the latch of the hinge piece 13 it may be quickly swung back out of the way and the remaining portion of the mould quickly knocked out of the flask, cleaned and the plastic dental plate recovered.

It is important to note that the pressure applied by the spring 71 and the pressure screw 74 reacts on top surface 73 of the injection plunger 23 in such a way as to apply the force directly down to the center member 10—13 to the abutment surface 25 of this member and of the side plate members 11 and 12. In so doing the hinge member 13 is automatically held in latched position with its surface 16 securely held against the surface 17 so as to provide a self interlocking rigid structure during pressure operation. It is also to be noted that by the exertion of side pressure by the screw 68 during the injection and curing operation under heat treatment that all clamp screws have been completely eliminated from the manipulation of the injection flask. The locating pins 33, 34 and 35 are primarily for initial manual location of the side plates with respect to the center member 10—13 and perform very little if any actual holding of the mould together during the actual pressure application and curing operations.

There has thus been provided an improved injection flask apparatus which is self contained and has forces directed to normally hold the flask in closed condition under pressure application and curing operations.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An injection flask structure including a base plate, an injection flask supported on said base plate, an injection plunger in top of said flask above said base plate, upright standards each side of base plate, clamp means operable in a direction parallel to said base plate for clamping the sides of said injection flask, tie bar means interconnecting the upper ends of said standards directly above said flask, and a yoke member pivotally mounted on the upper ends of said upright standards including pressure screw means, and resilient spring means interconnected between said pressure screw means and the top of said injection plunger.

2. In an injection flask actuating device including a base plate, upright standards on each end of said base plate, a clamp disc located in a plane perpendicular to said base plate, an actuating screw having an axis of operation parallel to said base plate, tie bar means including a fixed tie bar extending parallel to said base plate and rigidly interconnected with the upper ends of said standards, a demountable tie bar including a manipulating knob and a threaded connection with one of the upper ends of said standards located parallel to said fixed tie bar, a yoke member pivotally mounted on the upper ends of said standards, a cross member interconnecting said yoke members, pressure screws in said cross member, and spring means interconnected between said screws and injection plungers in flasks presented on said base plate.

ANTHONY J. HENNIKE,
GORDON MORRIS,
ELZA E. BROADY.

References Cited in the file of this patent

UNITED STATES PATENTS

| Number | Name | Date |
| --- | --- | --- |
| 94,323 | Lawrence | Aug. 31, 1869 |
| 1,962,410 | Rodin | June 12, 1934 |
| 2,506,071 | David | May 2, 1950 |
| 2,576,224 | Hordes | Nov. 27, 1951 |